(12) United States Patent
Perez Pablos et al.

(10) Patent No.: US 12,723,696 B2
(45) Date of Patent: Sep. 1, 2026

(54) NOISE REDUCTION FOR AIR FLOW DEVICES

(71) Applicant: Dyson Technology Limited, Wiltshire (GB)

(72) Inventors: Ignacio Justo Perez Pablos, Malmesbury (GB); Christopher Ashley Monk, Royal Wootton Bassett (GB)

(73) Assignee: Dyson Technology Limited, Malmesbury (GB)

( * ) Notice: Subject to any disclaimer, the term of this patent is extended or adjusted under 35 U.S.C. 154(b) by 206 days.

(21) Appl. No.: 18/288,105

(22) PCT Filed: Apr. 19, 2022

(86) PCT No.: PCT/GB2022/050977

§ 371 (c)(1),
(2) Date: Oct. 24, 2023

(87) PCT Pub. No.: WO2022/229595

PCT Pub. Date: Nov. 3, 2022

(65) Prior Publication Data

US 2024/0200710 A1 Jun. 20, 2024

(30) Foreign Application Priority Data

Apr. 29, 2021 (GB) ..................................... 2106116

(51) Int. Cl.
*F16L 55/033* (2006.01)

(52) U.S. Cl.
CPC .................................. *F16L 55/033* (2013.01)

(58) Field of Classification Search
CPC ............. F24F 2013/245; F04D 29/665; G10K 11/172; F16L 55/033
See application file for complete search history.

(56) References Cited

U.S. PATENT DOCUMENTS 3,312,389 A 4/1967 Matsui
5,493,080 A 2/1996 Moss
(Continued)

FOREIGN PATENT DOCUMENTS

EP 1085196 A1 3/2001
EP 2328141 A2 6/2011
(Continued)

OTHER PUBLICATIONS

International Search Report and Written Opinion received for PCT Patent Application No. PCT/GB2022/050976, mailed on Jul. 26, 2022, 9 pages.

(Continued)

*Primary Examiner* — Jeremy A Luks
(74) *Attorney, Agent, or Firm* — Tucker Ellis LLP

(57) ABSTRACT

A method of reducing noise in a device configured to generate an air flow. The device includes an air flow duct arranged to convey a flow of air, a gas-filled cavity disposed beside the air flow duct, and a wall separating the air flow duct and the cavity. The wall includes at least one aperture. The method includes optimising an acoustic property for an acoustic resistive screen that is to be held in tension over the aperture, by: determining geometric properties of the cavity, the aperture and the air flow duct; determining, based on the geometric properties, a noise reduction for the device for each of a series of values for the acoustic property of the screen; and comparing the respective noise reductions for the series of values to determine an optimised value of the series.

11 Claims, 5 Drawing Sheets

(56) References Cited

U.S. PATENT DOCUMENTS

| | | | | |
|---|---|---|---|---|
| 5,979,593 | A | 11/1999 | Rice et al. | |
| 6,669,436 | B2 * | 12/2003 | Liu | F04D 29/665 415/119 |
| 10,690,148 | B2 | 6/2020 | Sishtla | |
| 2005/0276684 | A1 | 12/2005 | Huang et al. | |
| 2011/0127107 | A1 | 6/2011 | Tanase et al. | |
| 2012/0156006 | A1 * | 6/2012 | Murray | F02C 7/045 181/290 |
| 2013/0306400 | A1 | 11/2013 | Hersh | |
| 2015/0253911 | A1 | 9/2015 | Howerton et al. | |
| 2017/0108010 | A1 | 4/2017 | Johnson et al. | |
| 2020/0309028 | A1 | 10/2020 | Murugappan et al. | |
| 2021/0233505 | A1 * | 7/2021 | Hakuta | G10K 11/161 |

FOREIGN PATENT DOCUMENTS

| | | | |
|---|---|---|---|
| FR | 2190185 | A5 | 1/1974 |
| GB | 2502104 | A | 11/2013 |
| GB | 2502106 | A | 11/2013 |
| GB | 2532557 | A | 5/2016 |
| WO | 80/02304 | A1 | 10/1980 |
| WO | 81/03201 | A1 | 11/1981 |
| WO | 2005/119031 | A1 | 12/2005 |
| WO | 2020/080112 | A1 | 4/2020 |
| WO | 2022/229594 | A1 | 11/2022 |

OTHER PUBLICATIONS

International Search Report and Written Opinion received for PCT Patent Application No. PCT/GB2022/050977, mailed on Jul. 13, 2022, 9 pages.

International Search Report and Written Opinion received for PCT Patent Application No. PCT/GB2022/050978, mailed on Jul. 28, 2022, 10 pages.

Search Report received for GB Application No. 2106115.5, mailed on Aug. 18, 2021, 2 pages.

Search Report received for GB Application No. 2106116.3, mailed on Sep. 30, 2021, 1 pages.

* cited by examiner

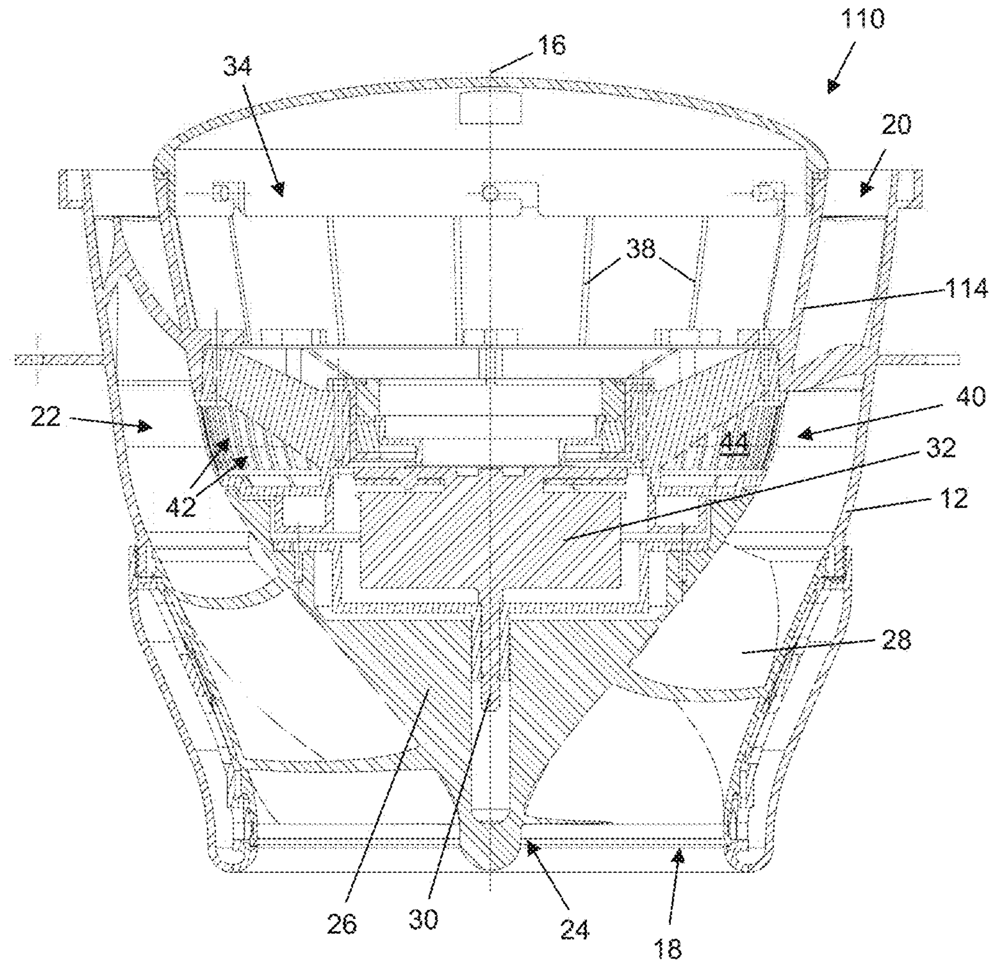
Fig. 3
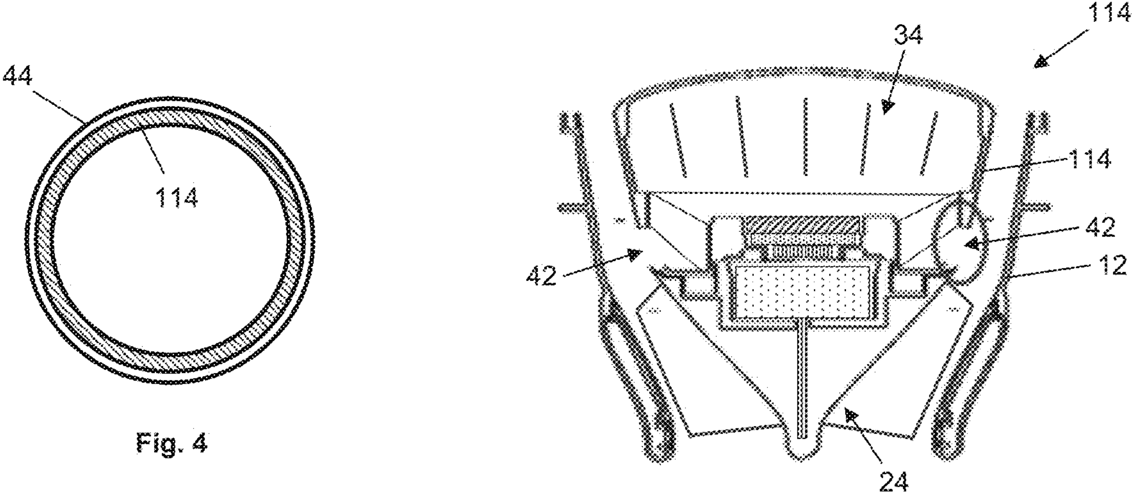
Fig. 4
Fig. 5

NOISE REDUCTION FOR AIR FLOW DEVICES

CROSS-REFERENCE TO PRIOR APPLICATION

This application is a § 371 National Stage Application of PCT International Application No. PCT/GB2022/050977 filed Apr. 19, 2022, which claims the priority of United Kingdom Application No. 2106116.3, filed Apr. 29, 2021, each of which are herein incorporated by reference in their entirety.

TECHNICAL FIELD

The invention relates to noise reduction arrangements for devices that generate an air flow, in particular for compressors and devices having a compressor arranged to pump air through an air duct.

BACKGROUND

Many devices that use compressors to generate an air flow suffer from noise, in particular if the air flow is directed through ducts and housings having geometries that can interact with the air flow to generate aerodynamic noise or cause resonance, standing waves or other noise-propagating phenomena. There is often a desire to mitigate such noise, particularly in consumer devices such as domestic appliances including environmental care products, floor care products and personal care devices, for example, for which acceptable noise levels may be relatively low.

In this respect, various noise mitigation techniques are known that can be incorporated into such devices. Many approaches focus on general damping of noise by absorption of acoustic energy, for example using dissipative materials such as a layer of foam. However, such approaches can often entail significant structural changes to the device to accommodate a sound absorbing body. Adding dissipative material may also complicate thermal management of the compressor or other parts of the device.

General noise damping may also have limited effectiveness in scenarios involving significant noise peaks at certain frequencies, especially if those peaks arise at relatively low frequencies. In this respect, in a device in which a resonance arises, for example, the peak sound power level (SWL) at the resonant frequency may be significantly higher than the SWL at neighbouring frequencies, for example by up to 15 dB. These peaks in SWL, which are driven by corresponding peaks in sound pressure levels (SPL), can be perceived by a user. For a general sound absorption approach, addressing these SWL peaks entails providing sound absorption that is either excessive for most frequencies, or that does not effectively remove noise at the resonant frequency.

It is against this background that the present invention has been devised.

SUMMARY OF THE INVENTION

An aspect of the invention provides a method of reducing noise in a device configured to generate an air flow. The device comprises an air flow duct arranged to convey a flow of air, a gas-filled cavity disposed beside the air flow duct, and a wall separating the air flow duct and the cavity, the wall comprising at least one aperture. The method comprises optimising an acoustic property for an acoustic resistive screen that is to be held in tension over the aperture, by: determining geometric properties of the cavity, the aperture and the air flow duct; determining, based on the geometric properties, a noise reduction for the device for each of a series of values for the acoustic property of the screen; and comparing the respective noise reductions for the series of values to determine an optimised value of the series.

This aspect of the invention recognises that optimal values for acoustic properties of an acoustic screen for an air flow device will exist and will be unique to the device, the optimal values being related to the physical characteristics of the device. Finding the optimal value for one or more acoustic parameters of the screen will enable the noise attenuation achieved by the screen to be maximised.

The acoustic property may comprise any of: acoustic impedance; acoustic resistance; and acoustic reactance.

Determining a noise reduction may comprise determining a sound power level reduction.

The method may comprise adjusting one or more of the geometric properties of the cavity, the aperture and the air flow duct.

The method may comprise determining a noise reduction for the device for each of the series of values for the acoustic property of the screen for a frequency range of interest. Such embodiments may further comprise determining the frequency range of interest by determining one or more frequencies at which increased noise levels arise when the device is in operation. The optimised value of the series of values for the acoustic property of the screen may comprise a value that corresponds to a minimum total noise level over the frequency range of interest, or a value that corresponds to a maximum noise attenuation at any frequency within the frequency range of interest.

Determining a noise reduction for the device for each of the series of values for the acoustic property of the screen optionally comprises simulating and/or modelling the acoustic performance of the screen.

The series of values for the acoustic property of the screen may comprise a series of values of a physical property of a material from which the screen is fabricated. The physical property may comprise a flow resistance of the material.

Another aspect of the invention provides a device configured to generate an air flow, the device comprising: a compressor; an air flow duct arranged to convey a flow of air generated by the compressor; a gas-filled cavity disposed beside the air flow duct; and a wall separating the air flow duct and the cavity, the wall comprising at least one aperture. The device further comprises an acoustic resistive screen covering and held in tension over the aperture of the wall, the screen being in fluid contact with air in the air flow duct and gas in the cavity and being configured to resist air flow between the duct and the cavity. The resistive screen and the cavity together define a noise-damping resonator. The cavity is gas-filled such that it is non-vacuous. The term gas includes air, or another gaseous fluid. Preferably, the gas fills the cavity such that the pressure in the air flow duct and the pressure in the cavity are comparable when the compressor is at rest.

The, or each, aperture cooperates with the cavity to create an acoustic resonator in the general form of a Helmholtz resonator that acts to attenuate noise in the flow duct. Noise attenuation is then refined by the acoustic resistive screen, which minimises aerodynamically generated noise at the aperture and introduces acoustic damping that acts on the resonator itself. The acoustic screen, the aperture and the cavity therefore cooperate to form a noise-damping resonator that provides effective reactive noise attenuation in a frequency range of interest.

The screen may comprise a porous material. In such an embodiment, the gas in the cavity is air and is substantially matches the air pressure in the duct when the compressor is at rest.

The screen may comprise a material having tuned acoustic resistance. In this respect, a tuned acoustic resistance refers to a material whose acoustic resistance has been selected or determined according to the specific characteristics of the device, to optimise noise attenuation.

The screen may comprise material having low acoustic reactance. For example, the screen may be configured with low depth or otherwise with low acoustic mass to provide low acoustic reactance. In this respect, low acoustic reactance means that acoustic resistance represents a majority of the acoustic impedance of the screen. Configuring the screen with a low acoustic reactance extends the frequency range over which the screen attenuates noise effectively.

The resistive screen optionally comprises a composite material and/or a polymer material.

The wall separating the air flow duct and the cavity may comprise multiple apertures, each aperture comprising a respective acoustic resistive screen. The respective screens may be continuous with each other.

In some embodiments, the screen is overmoulded onto the wall. In other embodiments, the screen is formed by wrapping.

A volume of the cavity may exceed a volume of the air flow duct. The volume of the cavity may be defined as a volume or three-dimensional space generally enclosed by walls and/or structures of the device. For example, the cavity may be substantially enclosed by a single continuous wall, or the cavity may be defined between two or more walls and/or structures of the device. It is possible for the cavity to be partially open, although fluid communication between the cavity and the flow duct may be prevented, and the cavity may be substantially fluid sealed.

The compressor may comprise an impeller, the impeller being at least partially located outside the gas-filled cavity. The compressor may further include a motor to drive the impeller. The motor may be disposed within the cavity. Alternatively, the motor may be outside the cavity and the impeller inside. The motor and impeller may both be inside the cavity. Having at least one of the motor and the impeller inside the cavity may provide for a compact design. However, it is also possible for both the motor and the impeller to be outside the cavity.

The screen may be attached to a side of the wall defining a boundary of the air flow duct.

The device may be embodied as a motor bucket assembly, or as a domestic appliance. The device may also be embodied as a portable and/or a wearable device.

Another aspect of the invention provides a method of reducing noise in a device configured to generate an air flow. The device comprises a compressor, an air flow duct arranged to convey a flow of air generated by the compressor, and a gas-filled cavity disposed beside the air flow duct. The method comprises: forming at least one aperture in a wall separating the air flow duct and the cavity; covering the aperture with an acoustic resistive screen so that the acoustic resistive screen is held in tension over the aperture and is in fluid contact with air in the air flow duct and gas in the cavity; and configuring the acoustic resistive screen to resist air flow between the duct and the cavity so that the resistive screen and the cavity together define a noise-damping resonator.

It will be appreciated that preferred and/or optional features of each aspect of the invention may be incorporated alone or in appropriate combination in the other aspects of the invention also.

BRIEF DESCRIPTION OF THE DRAWINGS

One or more embodiments of the invention will now be described, by way of example only, with reference to the accompanying drawings, in which like features are assigned like numerals, and in which:

FIG. 3 shows a compressor including a noise damping arrangement according to an embodiment of the invention;

FIG. 4 shows a cross-sectional view of the motor housing in FIG. 3;

FIG. 5 corresponds to FIG. 1 but shows an alteration to the compressor for a noise test;

DETAILED DESCRIPTION

In general terms, embodiments of the invention implement noise damping arrangements in a flow duct of a device comprising a compressor or that is otherwise configured to generate an air flow, or in a flow duct of a compressor itself, by making use of a cavity adjacent to the duct to create a noise-damping resonator. In this way, reactive silencing can be applied that attenuates noise effectively in a target frequency band, including low frequencies, by appropriate adjustment of the characteristics of the resonator.

To create the noise-damping resonator, one or more openings in a wall separating the flow duct from the cavity are covered by a screen of acoustic resistive material, which is hereafter referred to as an 'acoustic screen'. The openings may be pre-existing apertures, optionally modified in size and shape to create the required noise-damping behaviour. Alternatively, the openings may be added to the wall specifically for the purpose of creating the noise-damping resonator.

The openings and the cavity together define an acoustic cavity resonator, also referred to as a Helmholtz resonator, the openings collectively defining a neck of the resonator. This resonator acts to attenuate noise in the flow duct, with the noise damping being concentrated in a certain frequency band that is determined by physical characteristics of the resonator including the size, shape, number and distribution of the openings and the geometry of the cavity. The properties of the openings and/or the cavity can therefore be adjusted to tune the noise-attenuating response of the resonator to target frequencies of interest.

The acoustic screen is then added to refine the performance of the resonator, in particular by minimising aerodynamically generated noise at the openings and by introducing acoustic damping that acts on the resonator itself. Accordingly, the screen, openings and cavity together define a noise-damping resonator in embodiments of the invention.

The acoustic screen includes pores that are sufficiently small to resist most fluid exchange between the duct and the cavity and thereby avoid flow separation in the duct, whilst allowing a steady, low level fluid exchange until pressure in the cavity equalises with pressure in the flow duct, at which point fluid exchange substantially ceases. The pores also link the flow duct with the cavity to an extent that allows the openings and the cavity to act as a Helmholtz resonator.

Figure 1:
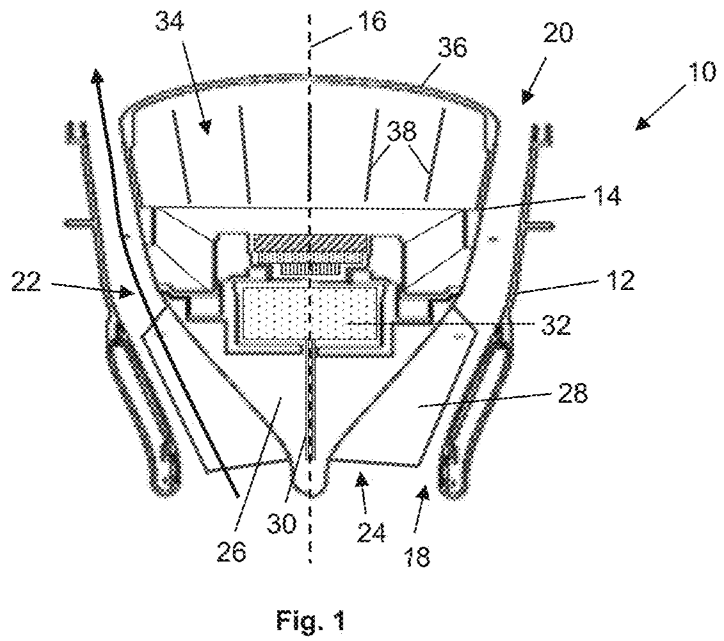
FIG. 1 is an axial cross section of a compressor to which embodiments of the invention may be applied.

Before describing specific embodiments of the invention, to illustrate the context for the invention FIG. 1 shows, in simplified schematic form, a motor bucket assembly defining a compressor 10 to which noise damping according to the invention may be applied. In this example, the compressor 10 is configured for use in a device such as an environmental care device, for example a fan.

The compressor 10 shown in FIG. 1 has the general form of a mixed flow compressor, and includes a bucket-shaped main housing 12 within which a hollow bucket-shaped motor housing 14 is disposed concentrically. Accordingly, the respective central axes of the main housing 12 and the motor housing 14 are aligned to define a common central axis 16 of the compressor 10.

The main housing 12 is open at its upper and lower axial ends. In the orientation shown in FIG. 1, the open lower end defines an inlet 18 of the compressor 10 and the open upper end defines an outlet 20 of the compressor 10.

The motor housing 14 is of a smaller diameter than the main housing 12, such that an annulus is defined between the exterior of the motor housing 14 and the interior of the main housing 12. This annulus defines a flow duct 22 through which air flows from the compressor inlet 18 to the compressor outlet 20, in use, in the direction indicated by the arrow in FIG. 1.

The respective upper ends of the main housing 12 and the motor housing 14 are substantially aligned, and the motor housing 14 is shorter axially than the main housing 12. Accordingly, a void is defined between a lower end of the motor housing 14 and the compressor inlet 18. This void is filled by a pumping member in the form of a rotor, specifically an impeller 24 having an axis of rotation that is aligned with the central axis 16 of the compressor 10, so that the impeller 24 is operable to pump air through the flow duct 22 towards the compressor outlet 20.

The impeller 24 comprises a solid main body 26 from which a circumferential series of blades 28 extend radially. The main body 26 of the impeller 24 is mounted to an impeller shaft 30 that extends along the central axis 16 of the compressor 10 upwardly into the motor housing 14 through an opening in the underside of the motor housing 14. An upper end of the impeller shaft 30 is coupled to a motor 32 that is centrally-mounted within the motor housing 14. The motor 32 is therefore configured to drive rotation of the impeller shaft 30 and, in turn, the impeller 24, to generate a flow of air through the flow duct 22.

The motor 32 occupies a lower portion of the motor housing 14. Above the motor 32, the motor housing 14 includes a substantially empty cavity or chamber 34 that is bounded by a generally frustoconical side wall and a domed top wall 36.

The motor housing 14 includes no openings aside from that through which the impeller shaft 30 enters the motor housing 14. The impeller shaft 30 is sealed by a suitable bearing where it penetrates the underside of the motor housing 14, and so the motor housing 14 is sealed to enclose an internal volume of air, or optionally another gas, within the chamber 34. Air contained within the chamber 34 of the motor housing 14 therefore cannot mix with air in the flow duct 22 in the arrangement shown in FIG. 1.

The chamber 34 of the motor housing 14 arises as the motor housing 14 also has the function of determining the geometry of the flow duct 22. In this respect, the motor housing 14 is shaped such that its side wall converges upwardly with the wall of the main housing 12 in the region of the flow duct 22, so that the flow duct 22 narrows upwardly to funnel air flowing towards the compressor outlet 20. As shall become clear in the description that follows, embodiments of the invention make use of the internal chamber 34 of the motor housing 14 as part of a noise damping arrangement.

The inner surface of the portion of the main housing 12 within the flow duct 22 also includes a circumferential series of radial vanes 38 that extend longitudinally towards the compressor outlet 20. The radial vanes 38 are configured to redirect air flowing through the flow duct 22 towards the outlet 20, thereby converting any circumferential component of the air flow discharged by the impeller 24 into pressure. Accordingly, the flow duct 22 acts as a stator. It follows that the internal chamber 34 of the motor housing 14 defines a stator chamber 34, to the extent that it is shaped to create the geometry of the stator.

Operation of the compressor 10 generates noise in various ways, which can excite SPL peaks at particular frequencies. For example, potential sources of noise in the compressor 10 include movement of the impeller 24 and components of the motor 32, as well as interaction between moving air and the surfaces of the compressor 10. Such noise is carried through the flow duct 22 and into the surroundings to be heard by a user. Noise may even be amplified by the flow duct 22 to some extent.

Figure 2:
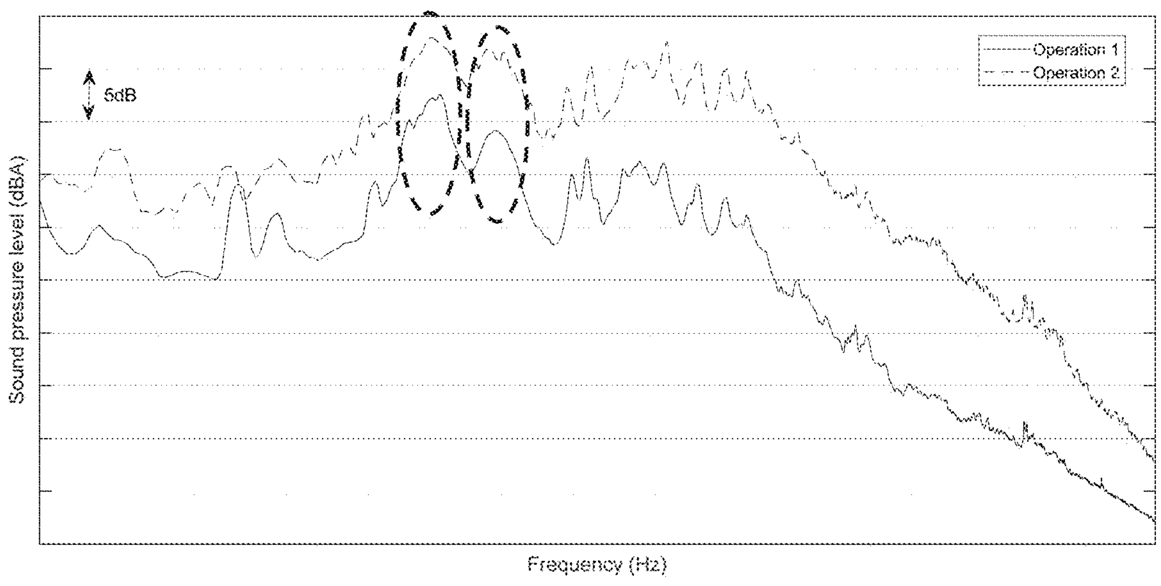
FIG. 2 shows far field measured SPL plots for the compressor of FIG. 1.

This is illustrated in FIG. 2, which shows measured far field measured noise levels for of the compressor 10 during testing. Specifically, FIG. 2 shows two plots that each represent a respective measured far field SPL over a frequency range of interest. The first plot represents the measured SPL for a first impeller speed, and the second plot represents the measured SPL for a second impeller speed, the second impeller speed being higher than the first impeller speed.

As is clear from FIG. 2, the general shapes of the two SPL plots are similar, with the SPL rising gradually up to a frequency around the midpoint of the range of interest, and falling sharply thereafter. Accordingly, most of the noise produced by the compressor 10 is at lower frequencies of the range of interest. As would be expected, the higher compressor speed generally produces a higher SPL at all frequencies.

Of particular interest are two SPL peaks manifesting in similar places in each plot, these peaks being circled in FIG. 2. These peaks relate to the specific characteristics of the compressor 10, including the geometry of the motor housing 14 and the flow duct 22, and so will occur at different frequencies for different compressor designs. In this example, the first, lower frequency peak is caused by a standing wave forming between the inlet 18 and the outlet 20 of the compressor 10, and the second, higher frequency peak is caused by cavity resonance between the impeller 24 and the motor 32.

It is noted that each of the plots has other SPL peaks at different frequencies. However, it is the shared peaks that are of particular interest as these indicate noise relating to the fixed physical features of the compressor 10 that will arise at substantially any impeller speed. It is noted that in other applications noise peaks may be caused by factors other than device geometry, and embodiments of the invention are effective for attenuating noise peaks generated by any source. Accordingly, implementing noise attenuation that targets a frequency band covering both of these frequencies will reduce the overall SWL at all impeller speeds, as the overall SWL is sensitive to the SPL peaks.

As the SPL peaks exhibited in FIG. 2 may exceed design tolerances, it is desirable to implement noise reduction that targets these peaks without compromising other aspects of the performance of the device or entailing significant structural changes to the device.

In this respect, FIG. 3 shows a compressor 110 according to an embodiment of the invention, which generally corresponds to the compressor 10 of FIG. 1 but has been modified to include a noise-damping resonator 40 that is tuned to damp noise in a frequency band extending within the range of interest shown in FIG. 2. In particular, the noise-damping resonator 40 is tuned to attenuate noise in a band encompassing the frequencies corresponding to the first and second peaks shown in FIG. 2.

Specifically, as FIG. 3 shows a circumferential array of rectangular slots 42 has been added to the wall of the motor housing 114, and the slots 42 are covered by an acoustic screen 44 defined by a layer of acoustic resistive material that is overmoulded onto the exterior of the motor housing 114. Accordingly, the portions of the wall that remain around and between the slots 42 define a frame that supports the acoustic screen 44.

The cross-sectional view of the motor housing 114 shown in FIG. 4 makes clear how the screen 44 extends around to encircle the exterior of the motor housing 114.

Aside from the acoustic screen 44 and the slots 42, the compressor 110 of FIG. 3 is identical to that of FIG. 1.

The slots 42 of the array extend through the full wall thickness of the motor housing 114, are identical to one another and are equi-angularly spaced around the motor housing 114 to encircle a region of the motor housing 114 directly above the motor 32. Accordingly, the slots 42 open into a lower end of the stator chamber 34 and so connect the flow duct 22 to the stator chamber 34. It is noted that the slots 42 may be configured in various other ways to support the acoustic screen 44.

It follows that the acoustic screen 44 that covers the array of slots 42 is located between the trailing edges of the impeller blades 28 and the leading edges of the stator vanes 38.

The acoustic resistive material from which the acoustic screen 44 is formed is a meshed material that includes micropores. In this context, 'micropores' are pores having a diameter measured in microns, for example in the range 10-500 microns. Various materials are suitable for forming the acoustic screen 44, for example polymer meshes or polymer-based composite materials, optionally comprising nanofibers. The acoustic screen may alternatively be formed from a microperforated metal plate, in which the pores may be formed by punching or etching, for example. A metal acoustic screen may offer the additional function of electromagnetic field shielding, which may be of particular benefit in a personal care device, for example.

The thickness of the acoustic screen 44 is below 0.5 mm in this embodiment, thereby minimising the impact of the screen 44 on the external profile of the motor housing 114 and, in turn, minimising negative effects with respect to aerodynamics in the flow duct 22. The low thickness of the screen 44 also minimises its acoustic mass and, in turn, the acoustic reactance of the screen 44. The small volume of the acoustic screen 44 is therefore in sharp contrast with the bulky sound absorbing bodies that are often used for noise reduction in similar contexts, and so the reduced space requirement of the screen 44 is a significant advantage over such arrangements.

Overmoulding the acoustic resistive material onto the exterior of the motor housing 114 ensures that the screen 44 is held taut across each slot. The screen 44 therefore substantially maintains its overall shape and the shape of its pores when a differential pressure arises on the screen 44 as air flows through the flow duct 22. In this respect, it is noted that any significant bowing of the screen 44 into the slots 42 under pressure would alter the shape of the flow duct 22 and therefore impact aerodynamics and, ultimately, pumping performance.

In other embodiments, the acoustic screen 44 may be formed in other ways that can also provide the required tension in the finished screen 44, for example by wrapping the material around the motor housing 114.

The acoustic screen 44 completely covers each of the slots 42 in the motor housing wall, and the micropores of the acoustic screen 44 are sufficiently small to resist significant fluid exchange between the flow duct 22 and the stator chamber 34, which could otherwise cause flow separation in the flow duct 22 and, in turn, increased noise. As noted above, the pores of the acoustic screen 44 allow a steady, low level fluid exchange between the flow duct 22 and the stator chamber 34, which enables pressure in the chamber 34 to equalise with pressure in the flow duct 22.

The micropores also act as dissipative elements to dissipate acoustic energy and also link the flow duct 22 to the stator chamber 34 to allow the slots 42 and the stator chamber 34 to form a Helmholtz resonator defining the noise-damping resonator 40, in which: the slots 42 collectively define a neck of the resonator 40; the pores of the acoustic screen 44 add acoustic resistance to the neck; and the stator chamber 34 represents a resonant cavity.

Accordingly, the acoustic screen 44, the slots 42 and the stator chamber 34 together define a noise-damping resonator 40 that provides reactive and dissipative attenuation of noise in the flow duct 22. The frequencies that are attenuated by the noise-damping resonator 40 is a function of the geometry of the stator chamber 34 and the slots 42, as well as the acoustic properties of the acoustic screen 44.

Figure 6:
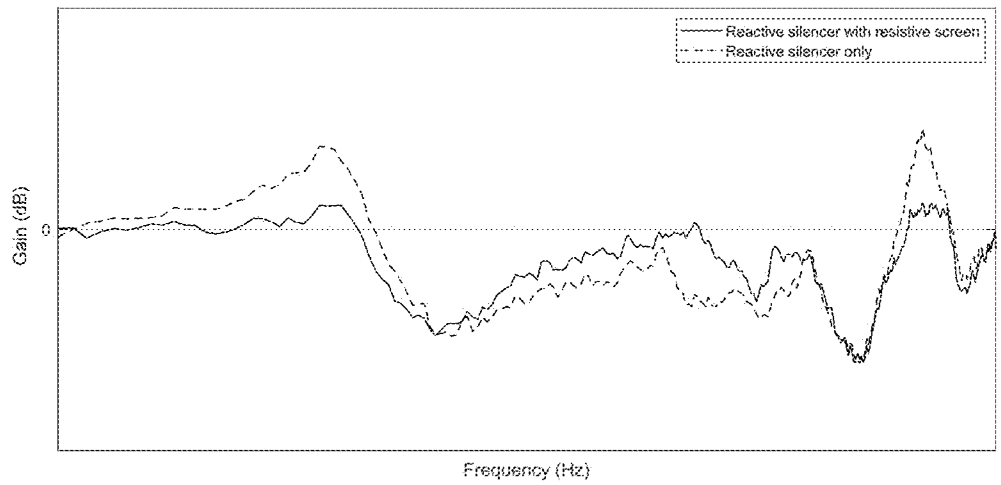
FIG. 6 shows plots of relative gain in SPL for the compressors of FIGS. 3 and 5.
Figure 7:
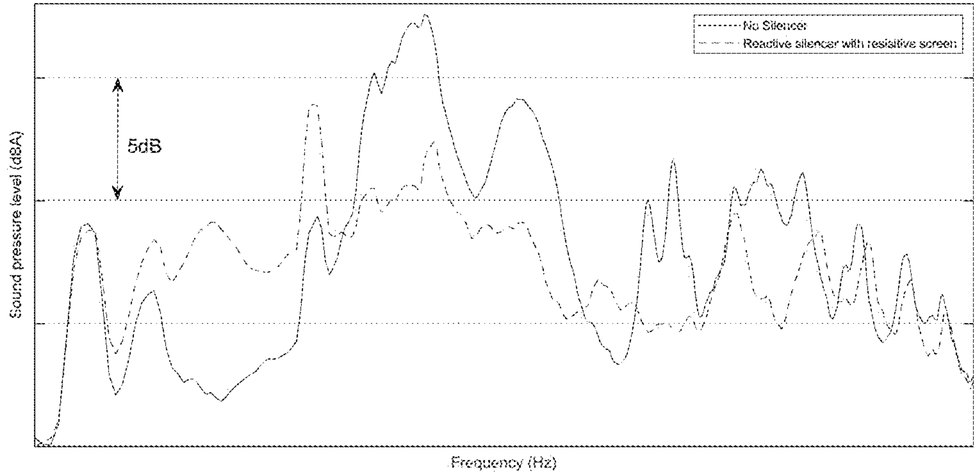
FIG. 7 shows SPL plots for the compressors of FIGS. 1 and 3.

The impact of the individual elements of the noise-damping resonator 40 is illustrated in FIGS. 6 and 7, which show the results of simulation and noise testing performed on variants of the compressor 110 shown in FIGS. 3 and 5. In this respect, FIG. 5 corresponds to FIG. 3 but shows the compressor 110 without the acoustic screen 44 covering the slots 42, such that the flow duct 22 is open to the stator chamber 34 via the slots 42. Accordingly, in the FIG. 5 variant a Helmholtz resonator exists as defined by the slots 42 and the stator chamber 34, but without the additional acoustic damping that is provided by the acoustic screen 44.

FIG. 6 shows two plots that provide a direct comparison between the respective acoustic behaviours of the compressor variants of FIGS. 3 and 5, and therefore illustrates the impact of the acoustic screen 44. Each plot shown in FIG. 6 represents a gain in SPL, measured in decibels, relative to a baseline SPL corresponding to the SPL for the compressor 10 of FIG. 1, which lacks any features of the noise-damping resonator 40 and has a solid wall separating the flow duct 22 and the stator chamber 34. The measured SPL for the variants of FIGS. 3 and 5 relate to noise levels measured when the respective compressor 110 is in operation.

A first plot shown in FIG. 6 is a dashed line representing a plot of the gain, relative to the baseline, corresponding to a measured SPL for the frequency range of interest for the variant shown in FIG. 5, which has the motor housing slots 42 but lacks the acoustic screen 44. The second plot, shown as a solid line in FIG. 6, represents the gain, relative to the baseline, in the measured SPL in the same frequency band for the variant of FIG. 3 that includes the acoustic screen 44.

As may be expected, the first and second plots are generally similar in shape, although the second plot generally exhibits lower SPL gain values than the first plot. The first and second plots are generally negative for most frequencies, indicating that adding the slots 42 has reduced noise levels relative to the base variant of FIG. 1, even without the acoustic screen 44. Indeed, the first and second plots show high levels of noise attenuation in the frequency band of interest in which the SPL peaks occur in the compressor 110 in normal use. This demonstrates that the Helmholtz resonator created by the slots 42 and the stator chamber 34 provides effective reactive noise-damping at these frequencies.

However, at each end of the frequency band of interest the first plot exhibits significant 'boosting', namely an increase in SPL above the baseline such that the gain values shown in FIG. 6 are positive, indicating an increase in noise at these frequencies compared to the compressor 110 without the slots 42.

The second plot, meanwhile, exhibits greatly reduced boosting relative to the first plot, whilst preserving much of the noise attenuation achieved in the region between the peaks defining the boosting. Although noise attenuation is slightly lower for the second plot in some parts of the frequency band of interest compared with the first plot, the gain in SPL level of the second plot is rarely positive, indicating that noise is attenuated at almost all frequencies. Moreover, the total acoustic energy, which is a function of the integral of a plot over the frequency range of interest, is significantly lower for the second plot than for the first plot, leading to a correspondingly lower SWL. Accordingly, adding the acoustic screen 44 refines the performance of the noise-damping resonator 40 by damping the peaks that manifest in the first plot.

FIG. 7 shows two SPL plots that compare the noise generated in the FIG. 3 variant and the FIG. 1 variant when the respective compressors 10, 110 are in operation, to show the difference in raw SPL values created by addition of the noise-damping resonator 40 in the FIG. 3 variant. A first plot, which is shown as a solid line in FIG. 7, corresponds to the first plot of FIG. 2, namely the measured SPL in the flow duct 22 of the FIG. 1 variant for the lower impeller speed. A second plot, which is shown as a dashed line in FIG. 7, represents the measured SPL in the flow duct 22 of the FIG. 3 variant, which includes the noise-damping resonator 40, for the same impeller speed.

It is immediately apparent from FIG. 7 that the noise-damping resonator 40 makes a significant impact on noise in the frequency range of interest, as the SPL for the second plot is 5 dBA or more lower than for the first plot at many points in this frequency band. Accordingly, the noise-damping resonator 40 successfully targets and damps the peaks in the measured SPL for the FIG. 1 variant of the compressor 10 that are discussed above with respect to FIG. 2.

Indeed, the second plot exhibits a lower SPL value than the first plot over much of the measured frequency range. The only exception to this is a region at the lower end of the range, where the second plot shows some boosting of noise levels relative to the first plot. However, this boosting is greatly outweighed by the noise attenuation apparent at the peaks in the first plot, which are at significantly higher energy levels, noting the logarithmic scale of FIG. 7.

So, adding the noise-damping resonator 40 generally improves noise levels for the compressor 110, which in the example shown in FIG. 7 equates to an overall SWL reduction in the order of 2 dBA. The small region of noise boosting that is created by the noise-damping resonator 40 can be mitigated by adjusting the geometry of the stator chamber 34.

Once it is established that the noise-damping resonator 40 effectively attenuates noise levels in the compressor, the properties of the acoustic screen 44 can be adjusted to optimise that noise attenuation and therefore maximise the reduction in SWL.

In particular, the pore size of the material used for the acoustic screen 44 can be adjusted to modify the specific airflow resistance of the material to an optimum level for the geometry of the compressor 110. Similarly, the pore density, namely the number of pores per unit area, also impacts the specific airflow resistance of the screen 44 and so can be adjusted in a similar manner. The skilled reader will appreciate that the specific airflow resistance of the material is directly related to its specific acoustic resistance, and in general terms the material for the acoustic screen 44 should have high acoustic resistance.

In this respect, the acoustic screen 44 may be considered acoustically resistive if it has a specific airflow resistance exceeding approximately 75 MKS Rayls, whereas below this value a material is typically considered acoustically transparent. In this context, a high acoustic resistance therefore means at least a resistance exceeding 75 MKS Rayls, and typically significantly higher than this. For example, resistance may be normalised with respect to the nominal resistance of air, which is defined as the product of the density of air ($\rho_0$) and the speed of sound (c), which is approximately equal to 412 MKS Rayls. In embodiments of the invention, the acoustic screen 44 may typically have a specific resistance in the order of one or two times the nominal resistance of air, and potentially more, which corresponds to a range of 75 to at least 1000 MKS Rayls for the airflow resistance.

It may also be desirable for the acoustic screen 44 to have a low acoustic reactance. In this respect, for a screen 44 of a given specific resistance a higher acoustic reactance will tend to narrow the frequency range over which the noise-damping resonator 40 effectively attenuates noise, and in particular will compromise attenuation at higher frequencies. Conversely, if the acoustic reactance is low such that specific resistance is the dominant part of the acoustic impedance, the screen 44 will achieve a more broadband attenuation.

However, maximising the reduction in SWL does not simply entail maximising the airflow resistance. Indeed, a maximised airflow resistance would entail a solid wall, which corresponds to the original compressor 10 of FIG. 1, meaning a compressor without the noise-damping resonator 40. Conversely, a minimised airflow resistance would correspond to the open slot arrangement of FIG. 5, which again does not provide optimal noise damping performance. Thus, an optimum airflow resistance value exists for each distinct system, and this optimal value will vary from one device to the next.

In general terms, the optimum value for the airflow resistance is most strongly impacted by the surface area of the acoustic screen 44 that is exposed to air flow and to air in the resonator cavity, namely the stator chamber 34, through the slots 42. Indeed, it has been found that there is almost direct proportionality between the screen surface area and the optimal airflow resistance value. Another variable that influences the optimal value of airflow resistance, albeit to a lesser extent, is the cross-sectional area of the flow duct 22. Conversely, the volume of the resonator cavity and the position of the acoustic screen 44 in the flow duct 22 have both been found to have little impact on the optimum airflow resistance.

Figure 8:
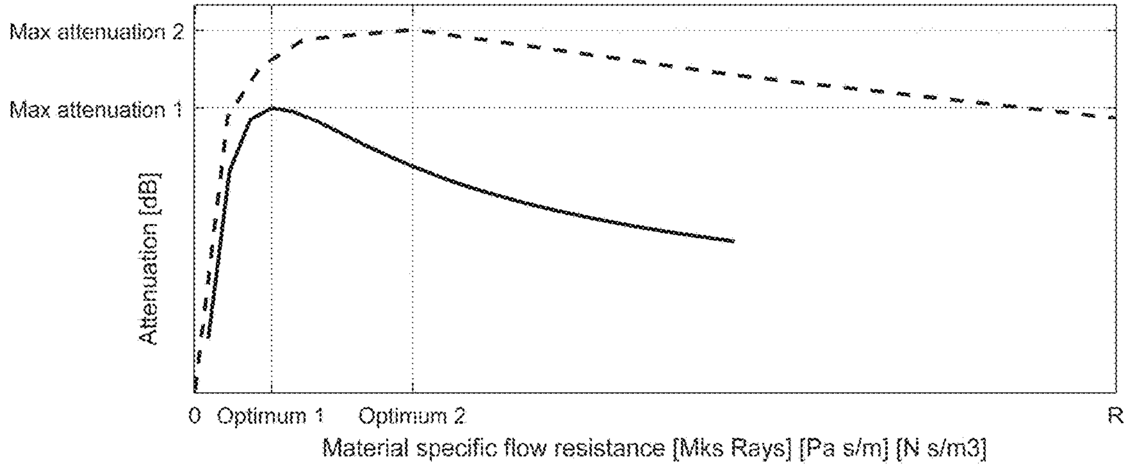
FIG. 8 is a graph showing how SWL attenuation varies when an airflow resistance of a screen of a noise damping arrangement is varied for the compressor of FIG. 3 and the device of FIG. 9.

In this respect, FIG. 8 shows the relationship between the specific airflow resistance of the acoustic screen material and the reduction, or attenuation, in SWL that is achieved for the arrangement of FIG. 3, which is represented by a solid line representing a first plot in FIG. 8. FIG. 8 also shows a second plot as a dashed line, which relates to an embodiment shown in FIG. 9 and is described later.

The first plot of FIG. 8 shows a rapid increase in SWL attenuation as the value of the material airflow resistance initially rises. This reflects the fact that the size and/or density of the pores is decreasing from an initial level that is too large to absorb acoustic energy effectively, such that the capacity of the pores to dissipate acoustic energy rises. At the extreme, when the resistance is minimal the pores are so large that they do not resist air flow between the flow duct 22 and the stator chamber 34 and so the screen 44 is acoustically transparent and therefore ineffective.

However, the initial increase in SWL attenuation does not continue indefinitely, as a point comes at which a further reduction in the size and/or density of the pores becomes detrimental to the linking of the flow duct 22 with the cavity to form a noise-damping resonator 40. Taken to the extreme, the pores will close entirely and the noise-damping resonator 40 will disappear.

Accordingly, the curve of FIG. 8 finds a peak beyond which the SWL attenuation falls gradually with further increasing airflow resistance. For the specific properties of the compressor 110 and noise-damping resonator 40 of FIG. 3, this peak corresponds to an SWL attenuation in excess of 2 dBA.

In practice, finding this optimal value for the airflow resistance may be achieved through modelling the system and simulating the noise levels at one or more impeller speeds for a range of values for the airflow resistance of the acoustic screen 44, for example using a finite element analysis package and/or a computational fluid dynamics package. As the optimal value is dependent on the geometry of the system, modelling the device accurately, for example using a 3D CAD package, will enable the contribution of that geometry to the optimal value to be accounted for.

Alternatively, the optimal airflow resistance value may be found by trial and error by testing a range of materials on a physical device. It may also be possible to find optimal values through mathematical modelling for relatively simple device geometries.

Although described above with respect to the specific example of the compressor 10 introduced in FIG. 1, it follows from the above that embodiments of the invention may be implemented in any device in which there is a desire to reduce noise in a flow duct that extends beside a cavity, to the extent that the cavity can be used as an acoustic volume by connecting the flow duct with the cavity by creating openings in a wall of the flow duct. An acoustic screen can then be added to cover the openings and thereby control the noise attenuation response. Devices in which the cavity has a volume exceeding that of the flow duct, as in the compressor 110 of FIG. 3, are particularly promising for noise damping in accordance with the invention, since this ratio of volumes supports effective reactive noise attenuation.

Figure 9:
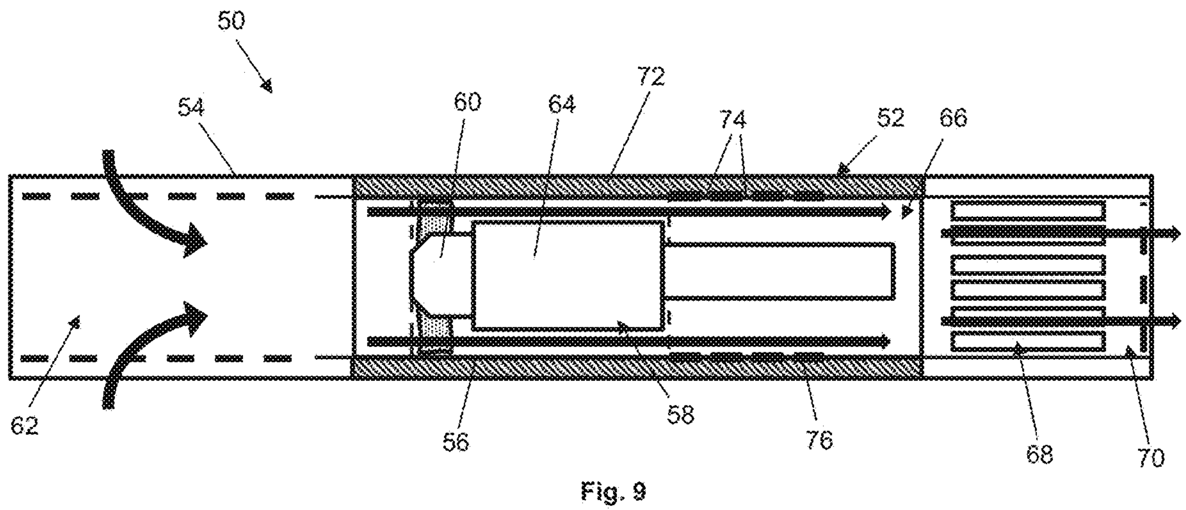
FIG. 9 shows an axial cross section of a personal care device including a noise damping arrangement according to another embodiment of the invention.

FIG. 9 shows another example of a device 50 including a noise-damping resonator 52 according to an embodiment of the invention. The device 50 shown in FIG. 9 is a handheld personal care device having a generally elongate, cylindrical structure predominantly defined by a tubular main housing 54.

The main housing 54 encloses a compressor housing 56 that is held in concentric relation with the main housing 54, the compressor housing 56 containing a compressor assembly 58. The compressor assembly 58 includes an impeller 60 disposed adjacent to an open end of the main housing 54 defining a device inlet 62 at the left end of the device 50, in the orientation shown in FIG. 9. The impeller 60 is driven by a motor contained in a motor housing 64. The motor housing 64 lies concentrically within the compressor housing 56 to form an annulus between the exterior of the motor housing 64 and the interior of the compressor housing 56, this annulus defining a flow duct 66 through which air pumped by action of the impeller 60 flows from right to left in FIG. 9. Beyond the motor housing 64, air flows through heater assemblies 68 before exiting through a nozzle 70 shown at the left end of the device 50 in FIG. 9.

A clearance is formed between the compressor housing 56 and the main housing 54 of the device 50 at an axial point downstream of the motor. This clearance defines an annular cavity 72 that is used as a resonator cavity in this embodiment. Accordingly, an array of openings 74 are created in the wall of the compressor housing 56 in the region of the annular cavity 72, the array extending both circumferentially around the compressor housing 56 and axially along the housing 56. An acoustic screen 76 is overmoulded onto the exterior of the compressor housing 56 to cover the openings 74.

Thus, the acoustic screen 76, the array of openings 74 in the compressor housing 56 and the annular cavity 72 between the compressor housing 56 and the main housing 54 collectively define the noise-damping resonator 52 in the device 50 of FIG. 9. Although the embodiment shown in FIG. 9 uses a different cavity as the acoustic volume for the noise-damping resonator 52 relative to the embodiment of FIG. 3, the operating principle is the same.

Figure 10:
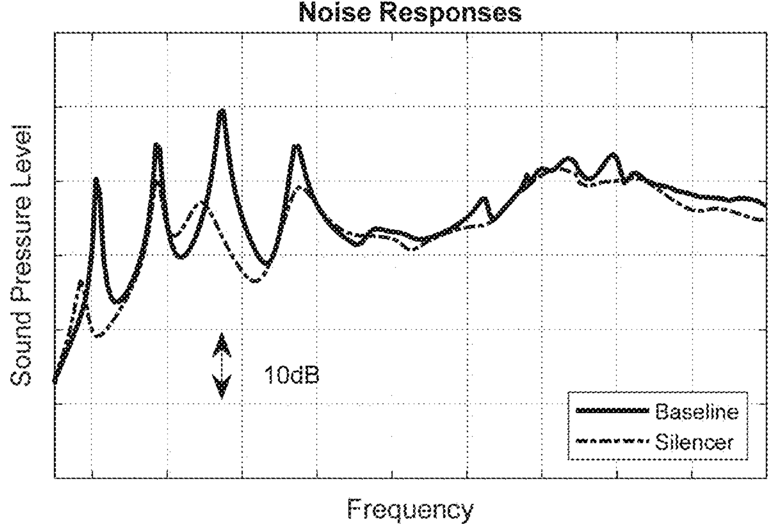
FIG. 10 shows SPL plots for the device of FIG. 9 and a baseline model.

FIG. 10 corresponds to FIG. 7, but represents the performance of the device 50 of FIG. 9. Accordingly, FIG. 10 shows two SPL plots, one plot indicating the noise generated in the device 50 shown in FIG. 9 when the impeller 60 is operating and a second plot indicating noise generated under the same conditions in a corresponding device 50 without the noise-damping resonator 52. In this example, the SPL for the device 50 including the noise-damping resonator 52 is almost universally lower than for the device 50 without the noise-damping resonator 52, and overall a reduction in the SWL of approximately 3 dBA is achieved in the device 50 of FIG. 9 using the noise damping resonator 52, with a main peak SPL being significantly reduced.

To achieve this SWL reduction, the acoustic screen 76 is formed using a material having an airflow resistance that is optimised for the geometry of the device 50 of FIG. 9. In this respect, returning to FIG. 8, the shape of the curve of the second, dashed plot defining the noise attenuation achieved for a range of material resistance values in the device 50 of FIG. 9 is similar to that of the first, solid plot, but not identical owing to the specific properties of the device 50 of FIG. 9. Specifically, as FIG. 8 shows the optimum value for the acoustic screen resistance is significantly higher for the device 50 of FIG. 9 than for the compressor 110 of FIG. 3. Also, the attenuation that is achieved is higher for the device 50 of FIG. 9 than in the compressor 110 of FIG. 3.

It will be appreciated that various changes and modifications can be made to the present invention without departing from the scope of the present application.

For example, although in the above-described embodiments a single acoustic screen is used to cover all of the openings of the noise damping resonator, in other embodiments multiple acoustic screens may be used in a single resonator, and in some cases each opening of the resonator may be covered by a respective discrete screen.

It is also possible to use multi-layered screens, or a screen defined by multiple nested screens forming a layered structure. In this respect, it has been found that additional screen layers increase the overall resistance, for example combining two layers approximately doubles the overall resistance. Accordingly, the number of screen layers can be used alongside the pore size and density as an additional variable for tuning the screen resistance.

The invention claimed is:

1. A method of reducing noise in a device configured to generate an air flow, wherein the device comprises an air flow duct arranged to convey a flow of air, a gas-filled cavity disposed beside the air flow duct, and a wall separating the air flow duct and the cavity, the wall comprising at least one aperture;

wherein the method comprises optimising an acoustic property for an acoustic resistive screen that is to be held in tension over the aperture such that the acoustic screen is held taut over the aperture, by:

determining geometric properties of the cavity, the aperture and the air flow duct;

determining, based on the geometric properties, a noise reduction for the device for each of a series of values for the acoustic property of the screen; and comparing the respective noise reductions for the series of values to determine an optimised value of the series.

2. The method of claim 1, wherein the acoustic property comprises any of: acoustic impedance; acoustic resistance; and acoustic reactance.

3. The method of claim 1, wherein determining a noise reduction comprises determining a sound power level reduction.

4. The method of claim 1, comprising adjusting one or more of the geometric properties of the cavity, the aperture and the air flow duct.

5. The method of claim 1, comprising determining a noise reduction for the device for each of the series of values for the acoustic property of the screen for a frequency range of interest.

6. The method of claim 5, comprising determining the frequency range of interest by determining one or more frequencies at which increased noise levels arise when the device is in operation.

7. The method of claim 5, wherein the optimised value of the series of values for the acoustic property of the screen comprises a value that corresponds to a minimum total noise level over the frequency range of interest.

8. The method of claim 5, wherein the optimised value of the series of values for the acoustic property of the screen comprises a value that corresponds to a maximum noise attenuation at any frequency within the frequency range of interest.

9. The method of claim 1, wherein determining a noise reduction for the device for each of the series of values for the acoustic property of the screen comprises simulating and/or modelling the acoustic performance of the screen.

10. The method of claim 1, wherein the series of values for the acoustic property of the screen comprises a series of values of a physical property of a material from which the screen is fabricated.

11. The method of claim 10, wherein the physical property comprises a flow resistance of the material.

* * * * *